US006899373B2

(12) United States Patent
Kim

(10) Patent No.: US 6,899,373 B2
(45) Date of Patent: May 31, 2005

(54) DOOR TRIM PANEL MOUNTING STRUCTURE

(75) Inventor: Han-Kyung Kim, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 10/749,227

(22) Filed: Dec. 30, 2003

(65) Prior Publication Data
US 2005/0062312 A1 Mar. 24, 2005

(30) Foreign Application Priority Data
Sep. 24, 2003 (KR) .................. 10-2003-0066370

(51) Int. Cl.[7] ............................................. B60R 13/02
(52) U.S. Cl. ................................................... 296/146.7
(58) Field of Search ...................... 296/146.7, 39.1; 49/502

(56) References Cited

U.S. PATENT DOCUMENTS 4,949,508 A * 8/1990 Elton ........................... 49/502
6,149,224 A * 11/2000 Tiberia et al. ............. 296/146.7
6,412,852 B1 * 7/2002 Koa et al. .................. 296/146.7
6,616,216 B2 * 9/2003 Furuyama et al. ......... 296/146.7

FOREIGN PATENT DOCUMENTS

JP 2000-71898 3/2002
KR 1998-042775 8/1998

* cited by examiner

Primary Examiner—Joseph D. Pape
(74) Attorney, Agent, or Firm—Morgan Lewis & Bockius LLP

(57) ABSTRACT

A vehicle door grip handle, a lower trim panel, and center trim panel are all securely and stably fixed to a door inner panel by a mounting screw. The center trim panel is folded up using a folding groove to access the mounting screw. Following installation of the mounting screw the folded center trim panel is unfolded to allow a hitching lug to be coupled to a hitching hole, thereby securing the center trim panel. Therefore, the mounting screw is not exposed to the outside due to the unfolded center trim panel and thus enables the vehicle door to maintain a beautiful exterior look on an inner side.

8 Claims, 4 Drawing Sheets

DOOR TRIM PANEL MOUNTING STRUCTURE

CROSS-REFERENCE TO RELATED APPLICATIONS

This application claims priority of Korean Application No. 10-2003-0066370, filed on Sep. 24, 2003, the disclosure of which is incorporated fully herein by reference.

FIELD OF THE INVENTION

The present invention generally relates a door trim panel of a vehicle. More particularly, the present invention relates to a technique of securely and beautifully mounting a door trim panel near a grip handle of a vehicle door.

BACKGROUND OF THE INVENTION

Typically, a door trim panel is mounted to the inside of a vehicle door. The door trim should be aesthetically pleasing and beautifully finished. The door trim is also often mounted with a grip handle that assists an occupant in closing the door. An important feature of the door trim is to provide a secure fixation point for the grip handle while maintaining an aesthetically pleasing appearance.

SUMMARY OF THE INVENTION

An embodiment of the present invention provides a door trim panel mounting structure configured to provide a sturdy and secure anchor point for the door trim at the point where a grip handle is mounted. Also, the door trim panel mounting structure provides a beautiful external appearance.

In accordance with a preferred embodiment of the present invention, a door trim panel mounting structure comprises center and lower trim panels which are separated and partially overlapped at a position where a grip handle is mounted. A panel mounting bracket is disposed at a door inner panel for alignment with the overlapped portion of the center and lower trim panels. A mounting screw is fastened to the panel mounting bracket via a screw hole formed on the lower trim panel which is overlapped and covered by the center trim panel. A folded groove is formed at an inner member defining an inner side of the center trim panel, where the center trim panel is folded, to allow the mounting screw to be fastened via a screw hole of the lower trim panel. Furthermore, a fixing means secures the center trim panel to the lower trim panel in an unfolded state.

BRIEF DESCRIPTION OF THE DRAWINGS

For fuller understanding of the nature and objects of the present invention, reference should be made to the following detailed description taken in conjunction with the accompanying drawings in which.

DETAILED DESCRIPTION OF THE PREFERRED EMBODIMENT

Figure 1:
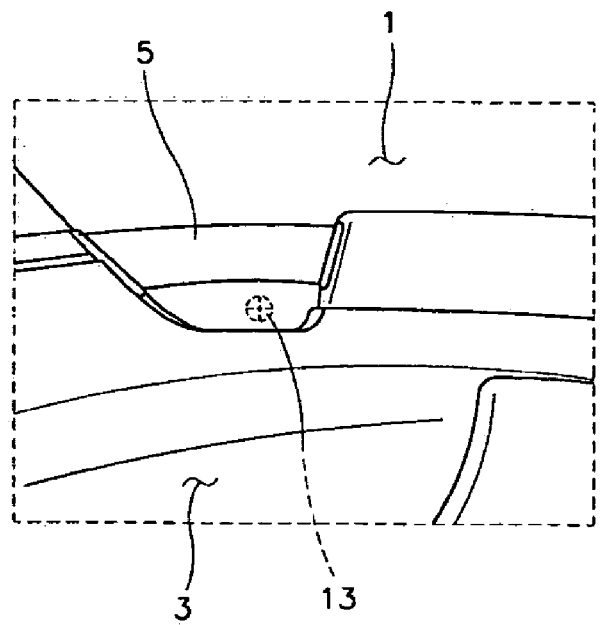
FIG. 1 illustrates an inner side of a door to which a door trim panel mounting structure is applied according to an embodiment of the present invention.
Figure 2:
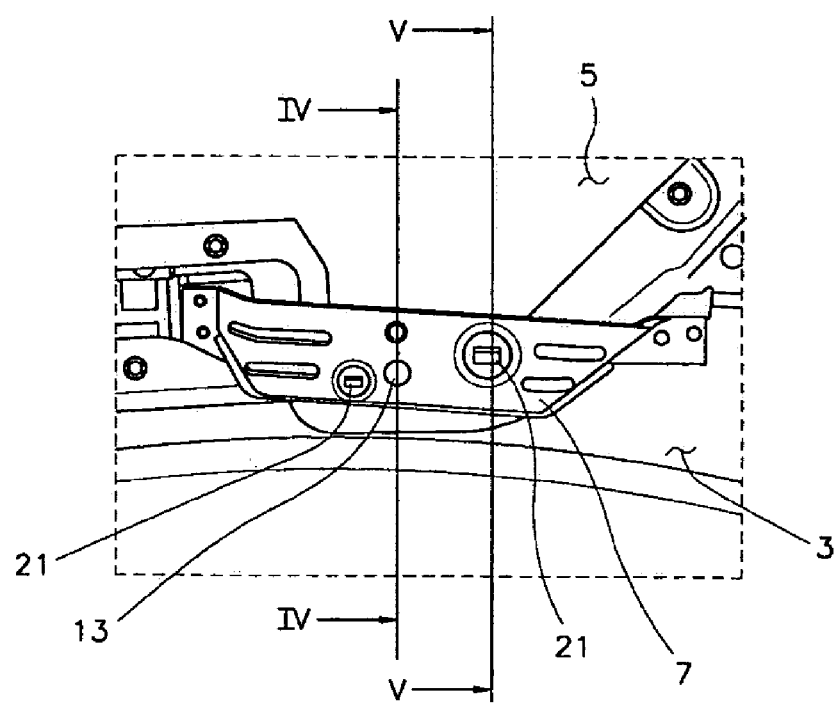
FIG. 2 illustrates a rear view of FIG. 1.
Figure 3:
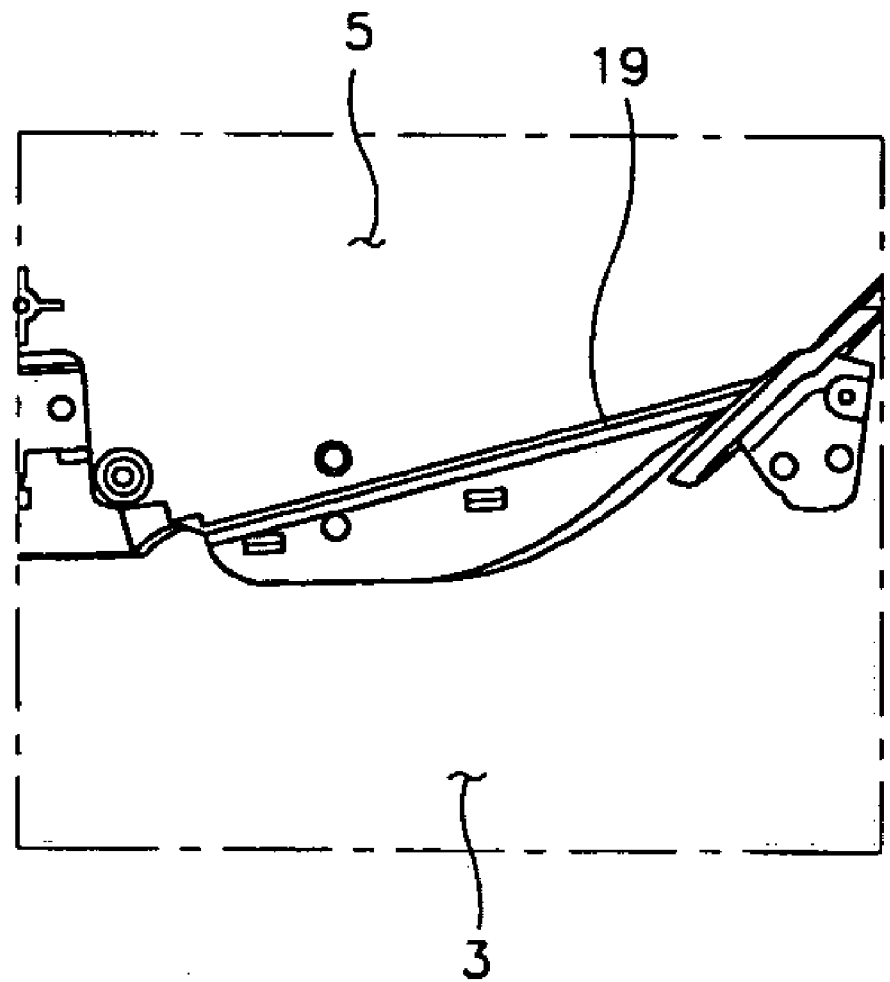
FIG. 3 illustrates a folded groove formed at a center trim panel.
Figure 4:
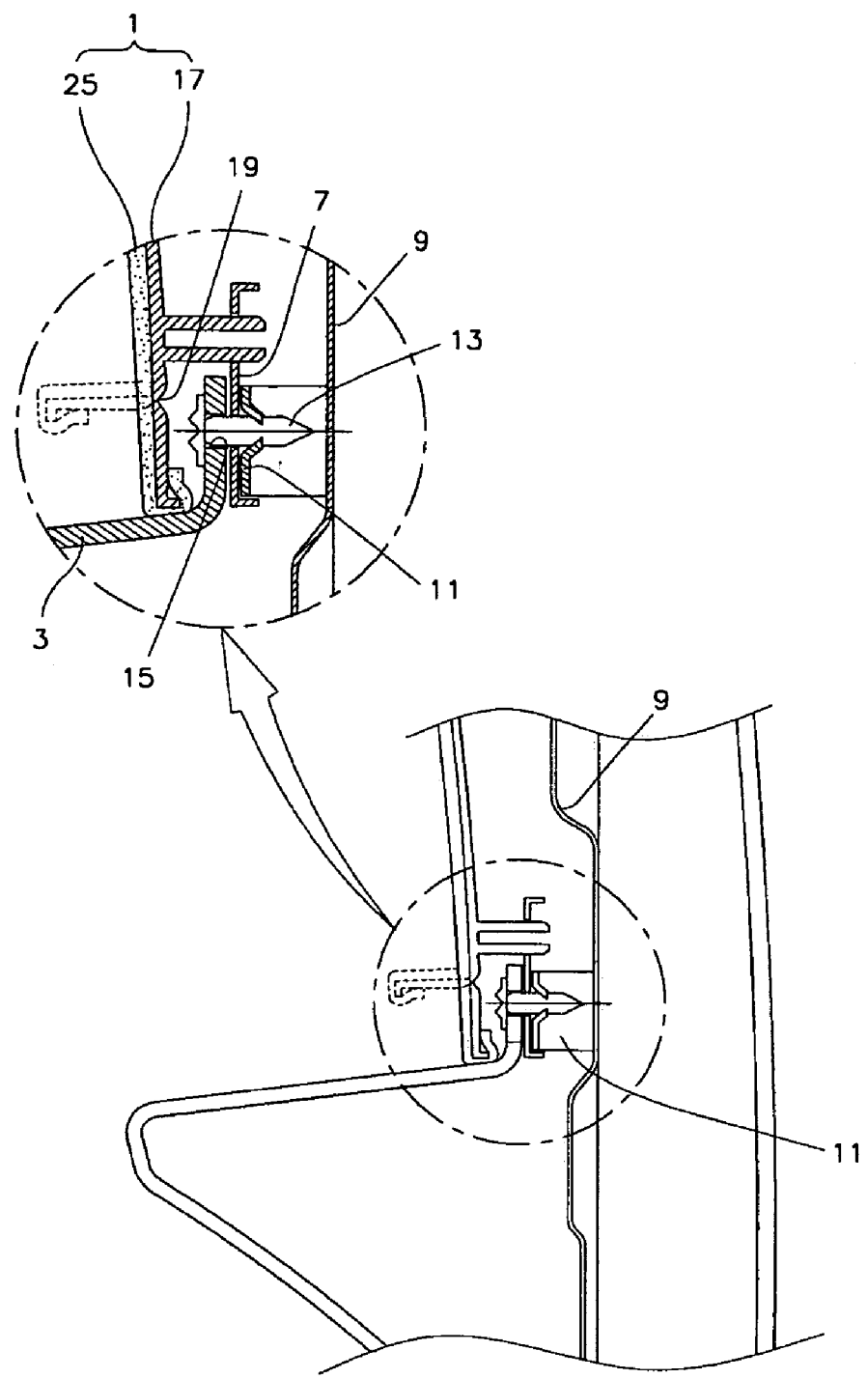
FIG. 4 is a cross-sectional view taken along line IV—IV of FIG. 2.
Figure 5:
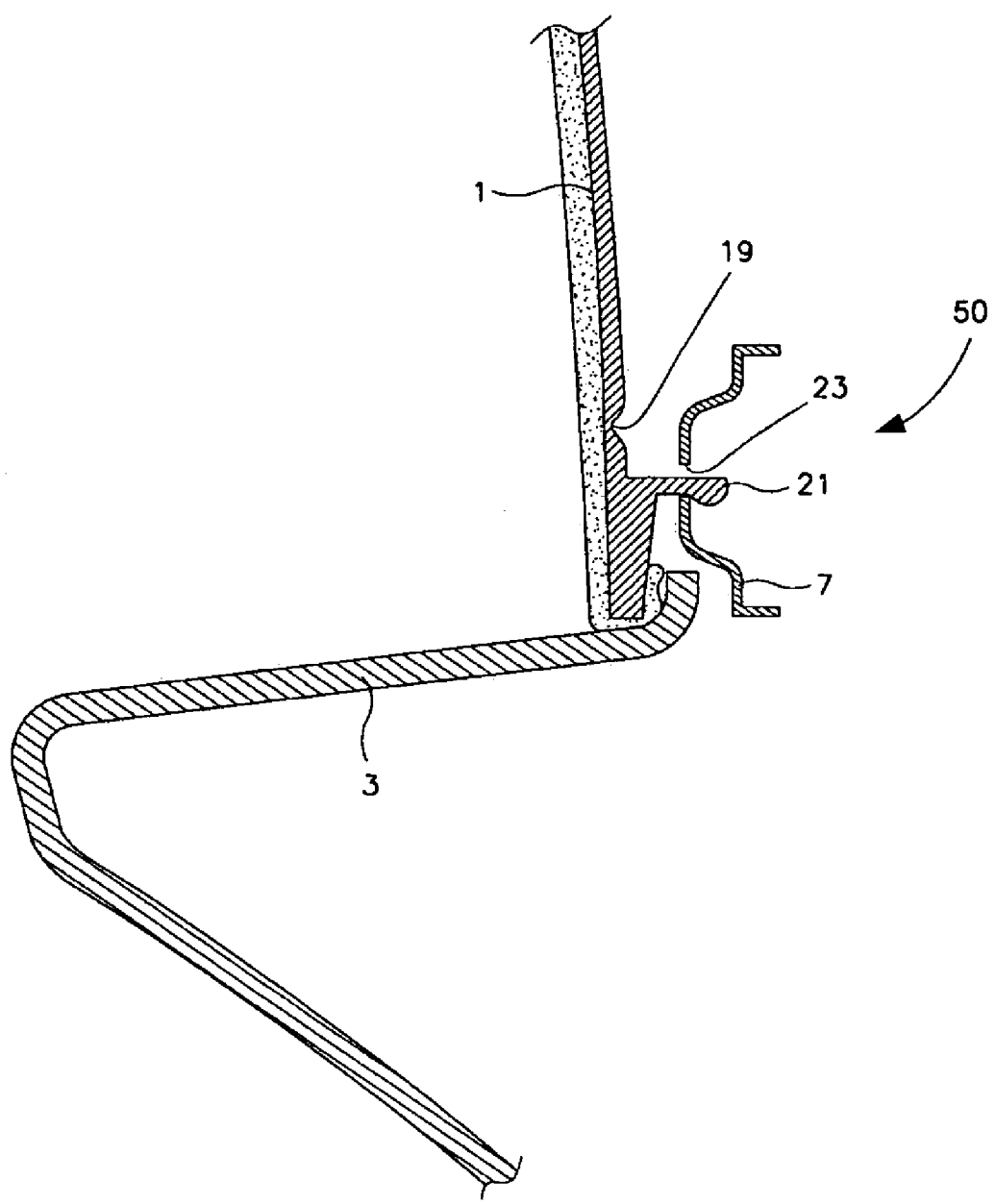
FIG. 5 is a cross-sectional view taken along line V—V of FIG. 2.

As illustrated in FIG. 1, an inner side of a door includes a center trim panel 1 and a lower trim panel 3 to which a grip handle 5 is fixed. According to FIG. 4, center trim panel 1 is divided into two panels, an inner member 17 and an outer member 25. Referring to FIG. 2, the grip handle 5 is mounted onto the lower trim panel 3 by a handle mounting bracket 7. Both ends of the handle mounting bracket 7 are secured to the inner side of the lower trim panel 3. Referring to FIGS. 4 and 5, the center trim panel 1 is a separate panel from the lower trim panel 3 where the grip handle 5 is mounted. These two panels partially overlap each other in the region that the grip handle 5 is mounted. A door inner panel 9 is also adjacent the overlap region and disposed with a panel mounting bracket 11. The panel mounting bracket 11 is aligned with the overlapped portion of the center trim panel 1 and the lower trim panel 3. The handle mounting bracket 7 is positioned between the panel mounting bracket 11 and the lower trim panel 3.

According to FIG. 4, a mounting screw 13 passes through a screw hole 15 in the lower trim panel 3. The mounting screw 13 further passes through the handle mounting bracket 7 and is terminally coupled with the panel mounting bracket 11. As a result, the grip handle 5 (FIGS. 1 and 2) can be maintained in a stable state by the handle mounting bracket 7 and the lower trim panel 3 being supported by the door inner panel 9 via the panel mounting bracket 11.

In order to fasten the mounting screw 13 to the screw hole 15, the screw hole 15 must be exposed such that a tool may approach the mounting screw 13. For this purpose, a folded groove 19 (FIGS. 4 and 5) is formed at the inner member 17 such that the center trim panel 1 can be folded to provide access to the screw hole 15. During assembly of the door trim panel the mounting screw 13 is fastened while the center trim panel 1 is folded at the folded groove 19, as illustrated by the broken lines of FIG. 4. At completion of the placement of the mounting screw 13, the center trim panel 1 is unfolded, as shown by the solid lines of FIG. 4, and fixed to the lower trim panel 3.

FIG. 5 illustrates a fixing means 50 for fixing the center trim panel 1 to the lower trim panel 3. The fixing means 50 includes a hitching lug 21 extending from the center trim panel 1 and a hitching hole 23 positioned in the handle mounting bracket 7. As shown in FIG. 5, the center trim panel 1 must be folded during assembly and later unfolded following assembly, therefore, inner member 17 can be made of a plastic material, or any other suitable flexible material, while the outer member 25 may be preferably made of leather or cloth which is not deformed by folding and unfolding movements. It should be appreciated that the materials used for constructing the inner member 17 and outer member 25 can be any suitable material for the intended purpose.

Following placement of the mounting screw 13, unfolding of the center trim panel 1, and engagement of the hitching lug 21 with the hitching hole 23 the grip handle 5, lower trim panel 3, and center trim panel 1 are securely and stably fixed to the door inner panel 9. Furthermore, following unfolding of the center trim panel 1, the mounting screw 13 is not exposed to the outside (to one's appearance), thus the beautiful exterior look of the inner door side is maintained.

As apparent from the foregoing, there is an advantage in the door trim panel mounting structure thus described according to the present invention in that a portion of a door trim panel being mounted to a grip handle is securely and stably coupled to a door to thereby enable to maintain a beautiful exterior look. The scope of this invention is not to be limited by the disclosure but be afforded the scope of the appended claims.

What is claimed is:

1. A door trim panel mounting structure comprising:
   center and lower trim panels, said two panels separated and partially overlapped at a place where a grip handle is mounted;
   a panel mounting bracket disposed at a door inner panel for alignment with the overlapped portion of said center and lower trim panels;
   a mounting screw fastened to said panel mounting bracket via a screw hole formed on said lower trim panel overlapped and covered by said center trim panel;
   a folded groove formed at an inner member defining an inner side of said center trim panel where said center trim panel is folded to allow said mounting screw to be fastened via a screw hole of said lower trim panel; and
   fixing means for securing said center trim panel to said lower trim panel with unfolded state.

2. The structure as defined in claim 1, wherein a handle mounting bracket for fixing said grip handle to said lower trim panel is disposed between said lower trim panel and said panel mounting bracket.

3. The structure as defined in claim 2, wherein said fixing means comprises a hitching lug provided at the center trim panel; and a hitching groove formed at said handle mounting bracket.

4. The structure as defined in claim 1, wherein said center trim panel is made of plastic at said inner member while an outer member of the center trim panel is made of material that is not deformed by folding and unfolding movements.

5. The structure as defined in claim 4, wherein said outer member is made of leather.

6. The structure as defined in claim 4, wherein the outer member is made of cloth.

7. A door trim panel mounting structure, comprising:
   a center trim panel;
   a lower trim panel configured and dimensioned to overlap said center trim panel near an end of said lower trim panel on an inner door side of said center trim panel;
   a panel mounting bracket coupled on an outer door side to an inner side of a vehicle door and coupled on an inner door side to an outer door side of said lower trim panel near said overlap;
   wherein said center trim panel is configured with a folding groove such that said center trim panel can be folded clear of a hole in said lower trim panel for mounting said lower trim panel to said mounting bracket; and
   wherein said center trim panel can be unfolded to cover said hole in said lower trim panel.

8. The structure of claim 7, further comprising a handle mounting bracket coupled to said panel mounting bracket for supporting an inner door handle.

* * * * *